Dec. 8, 1931.　　C. E. JOHNSON ET AL　　1,835,056
CONTROL FOR GENERATORS
Filed April 22, 1930

INVENTOR:
Carl E. Johnson
Earl Mendenhall
By
ATTORNEY.

Patented Dec. 8, 1931

1,835,056

UNITED STATES PATENT OFFICE

CARL E. JOHNSON, OF PASADENA, AND EARL MENDENHALL, OF LOS ANGELES, CALIFORNIA, ASSIGNORS TO STERLING ELECTRIC MOTORS, INC., OF LOS ANGELES, CALIFORNIA, A CORPORATION OF CALIFORNIA

CONTROL FOR GENERATORS

Application filed April 22, 1930. Serial No. 446,261.

Our invention relates to a novel electrical control system, one use of which is to control the generator or other potential source used in arc welding.

In the metallic arc system of welding it is customary to connect one terminal of a generator to the article to be welded, the other terminal being connected to the welding rod which is momentarily touched to the article and withdrawn a slight distance therefrom to form an arc between the tip of the welding rod and the article to be welded.

It is usually desirable to decrease the voltage across the arc as the current therethrough increases. One system of accomplishing this end is to connect a resistor in circuit with the arc so that as the current increases the voltage drop across this resistor correspondingly increases and thus decreases the voltage drop across the arc. This system is very wasteful of energy, the resistor often consuming 75% of the output of the generator.

Another system for accomplishing this end is to use a differential-wound generator having a main field winding which is sometimes separately excited and having a bucking series-field winding which carries a portion of the current passing through the arc, the amount of current passing through the series-field winding being controlled by a variable resistance thereacross. The setting of this variable resistance thus determines in a measure the maximum current that can be drawn by the arc, this being desirable inasmuch as the current used must conform to the particular type of weld which is being formed.

It is one of the objects of this invention to provide a novel construction for the magnetic circuit of a generator or other potential-producing means whereby the maximum current may be readily varied.

In its preferred form, and when applied to a generator, our system includes two windings on each pole-piece of the generator, one being the main winding and the other the series winding. The pole-piece is so formed that the series winding may be magnetically short-circuited in varying degrees by moving an iron member toward or away from the pole-piece, the member lying outside of the series winding so as to form an auxiliary flux path which by-passes the flux generated by the series winding instead of allowing this flux to pass through the main flux path.

It is an object of this invention to provide a control system wherein a winding surrounding a portion of a main flux path may be magnetically short-circuited in varying degrees to allow at least a portion of the flux generated thereby to pass through an auxiliary flux path.

Other objects of this invention lie in the provision of a novel apparatus whereby such a system is made commercially possible, the preferred form of such apparatus being herein described in detail, other forms being apparent to those skilled in the art.

Referring particularly to the drawings,—

Figure 1:
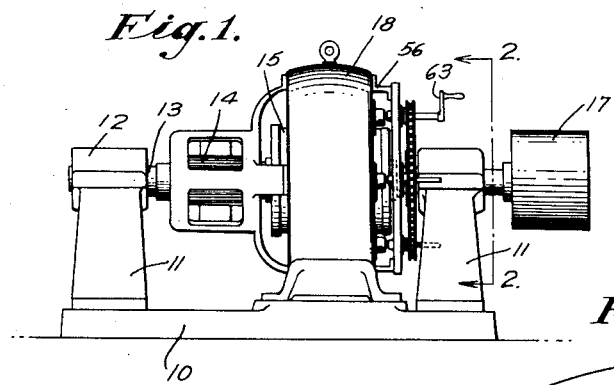
Fig. 1 is a side view of the generator incorporated in our invention.

Referring particularly to Fig. 1 the generator therein shown is provided with the usual base 10 and pedestals 11 which retain bearings 12 journalling a shaft 13. This shaft carries a commutator 14 and a rotor 15, both being positioned between the pedestals 11, and also carries a pulley or other drive means 17. A stator 18 surrounds the rotor 15 and includes a yoke member 19 which, in the form shown, is ring-shaped. The stator 18 also includes a plurality of laminated or cast pole-pieces 20 secured to the yoke member 19 by any suitable means such as cap screws 21, these pole-pieces being equally spaced around the axis of rotation of the shaft and extending radially inward. The innermost portions of these pole-pieces provide shoes 23 having a surface 22 which cooperates with the periphery of the rotor 15 in defining an air gap 24 in the usual manner. Four of these pole-pieces are shown, but it should be understood that any number of pairs might be utilized.

Each pole-piece is formed with a core 25, the upper end of which forms a neck portion 26 and the lower end of which is joined to the shoe 23 by an inner shoulder or extension 28 which provides a surface 29. A similar shoulder or outer extension 30 is positioned immediately below the neck portion 26 and provides a surface 31, the surfaces 29 and 31 cooperating in forming a channel 32 in which a series winding 33 of our invention is wound, the main winding being indicated by the numeral 34 and being wound around the neck portion 26.

The surface 29 is provided with grooves 38 which lie outside of the series winding 33 and which extend parallel to the axis of the shaft 13, one of these grooves lying on each side of the axis of the core 25. Similar grooves 39 are formed in the surface 31 and also extend parallel to the axis of the shaft 13, these grooves lying directly opposite the grooves 38.

Figure 3:
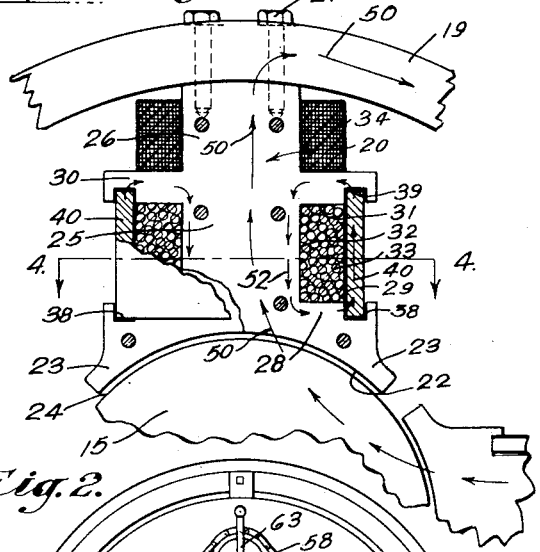
Fig. 3 is a view of one of the pole-pieces partially in section.
Figure 4:
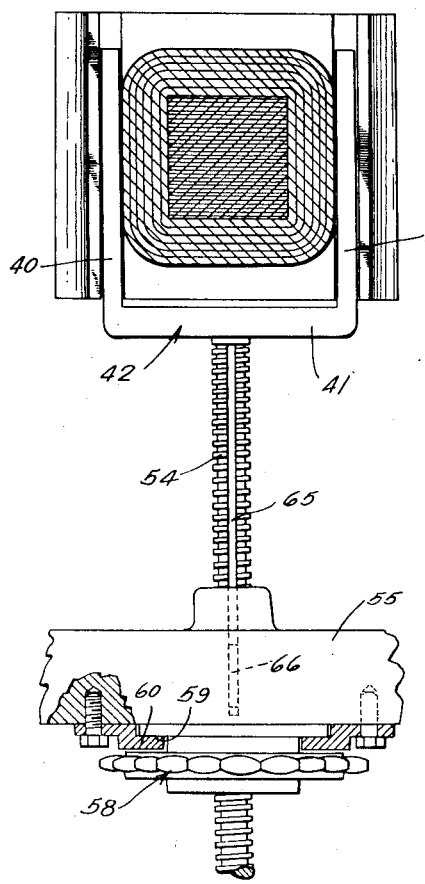
Fig. 4 is a view taken on the line 4—4 of Fig. 3.
Figure 2:
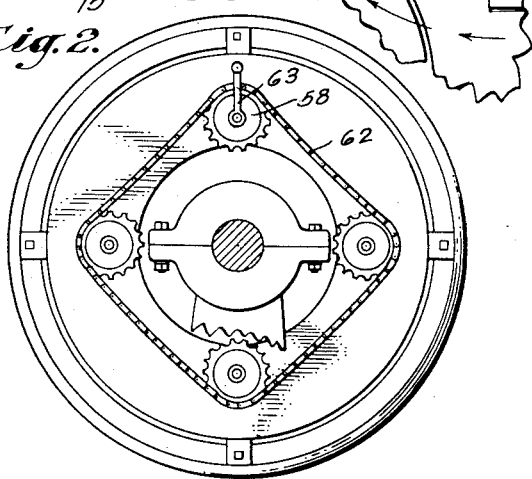
Fig. 2 is a view taken on the line 2—2 of Fig. 1 and represents the operating system of our invention.

The grooves 38 and 39 act as a guide means for legs 40 joined to a cross-bar 41, this cross-bar and the legs 40 cooperating to form a U-shaped control member 42 formed of iron or other metallic material. The legs 40 are so formed that they form a sliding fit with the walls of the grooves 38 and 39, as best shown in Fig. 3, and the U-shaped control member 42 may best be formed by bending a single piece of strap iron in the shape shown in Fig. 4 so that the cross-bar 41 is of the same height as the legs 40. Thus, when the control member 42 is moved toward the pole-piece 20, the legs 40 not only magnetically connect the extensions 28 and 30, but the cross-bar 41 moves into contact with these extensions when the control member 42 is in its extreme advanced position, this member being shown in a slightly retracted position in Fig. 4.

Adjacent pole-pieces 20 cooperate with the yoke member 19 and with the rotor 15 in forming a main flux path indicated by arrows 50, both windings 33 and 34 tending to force flux through this path. In addition, the U-shaped control member 42 cooperates with the extensions 28 and 30 in providing an auxiliary flux path indicated by the arrows 52, this flux path surrounding the series winding 33 in magnetically short-circuiting relationship. Thus, when the legs 40 are positioned only a short distance in the grooves 38 and 39, the reluctance of this auxiliary flux path will be relatively large due to the fact that all of the flux which passes through this auxiliary flux path must pass through those portions of the legs 40 which are positioned in the grooves 38 and 39, it being understood that these portions are at this time usually saturated. When, however, the legs 40 are moved farther into the grooves a correspondingly greater portion of these legs is available for conducting flux between the extensions 28 and 30 and the reluctance of the auxiliary flux path is correspondingly decreased. Finally, when the cross-bar 41 comes into contact with the face of the pole-piece 20, a further lowering of the reluctance of the flux path is obtained, and correspondingly more of the flux generated by the series winding is short-circuited rather than being sent through the main flux path.

It is desirable to be able to move all of the U-shaped control members 42 simultaneously, although this is not in all cases necessary. To provide such a unitary control system we prefer to operatively connect a screw means to each control member. Thus, in Fig. 4 we have shown a screw 54 rigidly secured to the cross-bar 41 and extending through an opening formed in a supporting ring 55, this opening being large enough to permit axial movement of the screw. The supporting ring 55 is ring-shaped and is supported on brackets 56 secured to the stator 18, as best shown in Fig. 1. A suitable nut means is threaded on each shaft, and in the preferred embodiment comprises a sprocket 58 threaded to the screw 54 and provides an annular groove 59 in which guide members 60 extend, these guide members being secured to the supporting ring 55 so as to prevent a movement of the sprocket 58 away from this member but permitting a rotation thereof so that the screw and its attached control member may be advanced and retracted. All of the sprockets 58 are connected by a chain or other drive means 62, and one of these sprockets is provided with a crank 63. Turning this crank simultaneously advances or withdraws all of the control members 42.

It is sometimes desirable to be able to entirely withdraw the legs 40 from the grooves 38 and 39 and for this reason it is preferable to cut a keyway 65 in the screw 54, and to position a key 66 in the opening of the supporting ring 55, this key fitting in the keyway 65 to prevent any rotation of the screw 54 and thus allowing the arms to be completely withdrawn from the grooves 38 and 39 without becoming disaligned therewith. In addition, it will be noted that the supporting ring 55 is mounted on that end of the stator 18 which is opposite to the commutator 14. In the usual type of generator, this ring will be mounted adjacent the pulley end of the generator, as best shown in Fig. 1, and this positioning of the ring is highly desirable in view of its accessibility and in view of the fact that it does not interfere with commutation.

Figure 5:
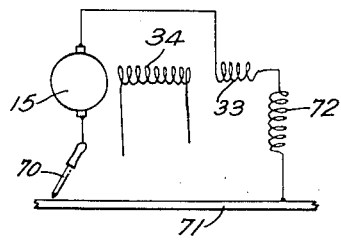
Fig. 5 is a wiring diagram of the generator.

It is possible to connect the windings 33 and 34 in various ways. When used with an arc-welding outfit, however, it is preferable to connect the winding 33 in series with the winding on the rotor 15 and in bucking relationship with the winding 34 which, if desired, may be energized from an independent source. This method of connection is shown in Fig. 5 which also shows one terminal of the generator connected to a welding rod 70, and one terminal of the series field connected to the member 71 which is to be welded, a suitable reactance 72 being put in series with this circuit to stabilize the current fluctuations which are usually produced. Thus, when the current passing through the arc increases, the action of the series field is to reduce the total flux passing through the main flux path. The amount of this reduction is, of course, dependent upon the position of the U-shaped control members 42, as previously explained, this reduction being greatest when the legs 40 are withdrawn from the grooves 38 and 39. In other instances it is desirable to connect the series winding 33 so that it acts cumulatively. It should thus be understood that we are not limited to the particular connection most useful in arc welding, the fundamental idea of our system when applied to a compound generator being the possiblity of regulating by magnetic means the effectiveness of the series winding in assisting or counter-acting the flux generated by the main winding 34.

Neither should it be understood that our invention is applicable only to generators, for this control system whereby a winding is magnetically short-circuited in varying degrees is applicable to other electrical installations as well.

Finally, it is within the scope of this invention to dispense with the grooves 38 and 39 and simply move the control member in sliding relationship relative to the extensions or simply move the control member toward or away from the extensions to change the air gap therebetween. Further, we are not limited to the particular shape of control members shown. Obviously, each leg 40 might be moved independently without being connected to a cross bar 41. In fact, it is in some instances possible even to dispense with the extensions 28 and 30, allowing the control member to approach the core 25 in magnetically short-circuiting relationship.

We claim as our invention:

1. In combination in a dynamo-electric machine: a member formed of magnetic material and forming a part of a main flux path; a winding surrounding said member and adapted to force flux through said main flux path; a U-shaped member providing legs sufficiently far apart to span said winding, said legs lying in close proximity to said member to form an auxiliary flux path short-circuiting said main flux path; and means for moving said U-shaped member relative to said member formed of magnetic material.

2. In combination in a dynamo-electric machine: a member formed of magnetic material and forming a part of a main flux path, said member providing a pair of extensions each of which provides a groove; a winding wound around said member between said extensions and adapted to force flux through said main flux path; and a member formed of magnetic material and slidable in said grooves to form a short-circuiting path for diverting certain of said flux which would otherwise pass through said main flux path.

3. In a dynamo-electric machine, the combination of: a magnetic member forming a part of a magnetic circuit; a main winding setting up a magnetomotive force tending to send flux through said magnetic member; an auxiliary winding setting up an auxiliary magnetomotive force tending to force flux through said magnetic member; and means having a high permeability for magnetically short-circuiting the flux formed by said auxiliary winding.

4. In a dynamo-electric machine, the combination of: a magnetic member forming a part of a magnetic circuit; a main winding setting up a magnetomotive force tending to send flux through said magnetic member; an auxiliary winding setting up an auxiliary magnetomotive force tending to force flux through said magnetic member; means movably mounted to move toward or away from said magnetic member in magnetically short-circuiting relation with the flux formed by said auxiliary winding; and control means for moving said means relative to said magnetic body.

5. In a dynamo-electric machine, the combination of: a magnetic member forming a part of a magnetic circuit; a main winding setting up a magnetomotive force tending to send flux through said magnetic member; an auxiliary winding setting up an auxiliary magnetomotive force tending to force flux through said magnetic member; guide means formed in said magnetic member to one side of said auxiliary winding; and a member formed of a magnetic material and slidable relative to said guide means.

6. In a dynamo-electric machine, the combination of: a magnetic member providing a core and a pair of extensions; a main winding around said core in a primary position; an auxiliary winding around said core in a secondary position between said extensions; and a member formed of magnetic material and movable relative to said extensions in magnetically short-circuiting relation therewith.

7. A combination as defined in claim 6 in which said extensions provide guide means to one side of said auxiliary winding in which guide means said member formed of magnetic material is slidable.

8. In a dynamo-electric machine, the combination of: a pair of pole-pieces formed of magnetic material; magnetic means joining said pole-pieces and adapted to carry flux from one to the other; a magnetic body in spaced relationship relative to said pole-pieces and cooperating therewith and with said magnetic means in defining a flux path; a main winding for forcing flux through said flux path; an auxiliary winding for forcing flux through said flux path; and means associated with said auxiliary winding for magnetically short-circuiting a desired portion of the flux set up by said auxiliary winding.

9. In a direct-current generator, the combination of: a stator including a yoke and a plurality of pole-pieces; a rotor mounted to rotate adjacent said pole-pieces and cooperating therewith and with said yoke in forming flux paths; a rotor winding on said rotor; a main stator winding wound on said pole-pieces; an auxiliary stator winding wound on said pole-pieces in spaced relationship with said main stator winding; members formed of magnetic material and shaped to magnetically bridge said auxiliary windings on said pole-pieces; and means for simultaneously moving said members toward and away from said pole-pieces.

10. In a direct-current generator, the combination of: a stator including a yoke and a plurality of pole-pieces; a rotor mounted to rotate adjacent said pole-pieces and cooperating therewith and with said yoke in forming flux paths; a rotor winding on said rotor; a main stator winding wound on said pole-pieces; an auxiliary stator winding wound on said pole-pieces in spaced relationship with said main stator winding; members formed of magnetic material and shaped to magnetically bridge said auxiliary windings on said pole-pieces; a screw means operatively connected to each of said members; and nut means threaded to said screw means for advancing and retracting said members.

11. In a direct-current generator, the combination of: a stator including a yoke and a plurality of pole-pieces; a rotor mounted to rotate adjacent said pole-pieces and cooperating therewith and with said yoke in forming flux paths; a rotor winding on said rotor; a main stator winding wound on said pole-pieces; an auxiliary stator winding wound on said pole-pieces in spaced relationship with said main stator winding; members formed of magnetic material and shaped to magnetically bridge said auxiliary windings on said pole-pieces; a screw means connected to each of said members; supporting means for supporting said screw means; nut means for advancing said screw means relative to said supporting means; and means for simultaneously turning said nut means.

12. In combination in a dynamo-electric machine: a core formed of magnetic material and forming a part of a main flux path; a winding surrounding said core and adapted to force flux through said main flux path; a pair of extensions on opposite ends of said winding and in flux-transferring relationship with respect to said core; a leg member joining said extensions and positioned to one side of said core, said leg member and said pair of extensions cooperating in defining an auxiliary flux path through which a portion of the flux otherwise passing through said main flux path may be short-circuited; and means for varying the reluctance of said auxiliary flux path.

13. In combination in a dynamo-electric machine: a member formed of magnetic material and forming a part of a main flux path, said member providing a pair of extensions; a winding around said member between said extensions and adapted to force flux through said main flux path; and a cross-bar formed of magnetic material and movable toward and away from said extensions to define a short-circuiting path of variable reluctance for diverting certain of said flux which would otherwise pass through said main flux path.

14. A combination as defined in claim 13 in which said cross-bar is movable from a position in surface contact with said extensions to a position away from said extensions to form an air space therebetween.

In testimony whereof, we have hereunto set our hands at Los Angeles, California, this 16th day of April, 1930.

CARL E. JOHNSON.
EARL MENDENHALL.